US011807433B2

(12) United States Patent
Kaminski et al.

(10) Patent No.: US 11,807,433 B2
(45) Date of Patent: Nov. 7, 2023

(54) PRESSURE CONTAINING/RELIEVING CAP FOR A LIQUIFIED NATURAL GAS RECEPTACLE

(71) Applicant: Parker-Hannifin Corporation, Cleveland, OH (US)

(72) Inventors: Benjamin D. Kaminski, Golden Valley, MN (US); Jason Mikulski, Bloomington, MN (US); Paul E. LeMay, Shoreview, MN (US); Daniel T. Nicolino, Uniontown, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 107 days.

(21) Appl. No.: 17/326,413

(22) Filed: May 21, 2021

(65) Prior Publication Data

US 2021/0371174 A1    Dec. 2, 2021

Related U.S. Application Data

(60) Provisional application No. 63/031,123, filed on May 28, 2020.

(51) Int. Cl.
*B65D 51/16* (2006.01)
*F16K 17/168* (2006.01)
(Continued)

(52) U.S. Cl.
CPC ........ *B65D 51/1688* (2013.01); *F16K 17/168* (2013.01); *F17C 13/06* (2013.01);
(Continued)

(58) Field of Classification Search
CPC .............. B65D 51/1688; F16K 17/168; B60K 15/0409; B60K 2015/0432;
(Continued)

(56) References Cited

U.S. PATENT DOCUMENTS 4,036,399 A    7/1977 Gerdes
4,339,055 A    7/1982 Hutzenlaub
(Continued)

FOREIGN PATENT DOCUMENTS

CN    109268676 A * 1/2019 ............ F17C 13/002

OTHER PUBLICATIONS

Extended European Search Report dated Sep. 14, 2021 in connection with corresponding EP Application No. 21175925.

*Primary Examiner* — John K Fristoe, Jr.
*Assistant Examiner* — Laura E. Parker
(74) *Attorney, Agent, or Firm* — Renner, Otto, Boisselle & Sklar, LLP (57) ABSTRACT

A cap for closing an opening of a receptacle such as for a liquefied natural gas container. The cap includes a main body and a sealing surface for sealing the opening of the receptacle. A lock/release mechanism is provided to lock the cap onto the receptacle, or enable the cap to be removed from the receptacle. A relief valve of the cap is activatable to relieve pressure within the receptacle. A grip overlies the main body and a relief valve actuator, enabling a user to activate the relief valve via the grip. The cap is configured to relieve pressure in a first stage of removal, and then unlock from the receptacle in a second stage of removal. A catch and secondary pressure relief features are provided to control removal of the cap. Magnets may be provided for proximity sensors to indicate proper closure of the cap on the receptacle.

18 Claims, 7 Drawing Sheets

(51) Int. Cl.
 *F17C 13/06* (2006.01)
 *B60K 15/04* (2006.01)
(52) U.S. Cl.
 CPC .. *B60K 15/0409* (2013.01); *B60K 2015/0432* (2013.01); *F17C 2205/0311* (2013.01)
(58) Field of Classification Search
 CPC ............... B60K 15/0406; F17C 13/06; F17C 2205/0311; F17C 2223/0161
 USPC .......................................... 220/202, DIG. 33
 See application file for complete search history.

(56) References Cited

U.S. PATENT DOCUMENTS

| | | | |
|---|---|---|---|
| 4,795,053 A | | 1/1989 | Kasugai et al. |
| 5,520,300 A | * | 5/1996 | Griffin ............... B60K 15/0409 220/210 |
| 6,095,363 A | * | 8/2000 | Harris ................ B60K 15/0406 220/203.26 |
| 6,206,219 B1 | * | 3/2001 | Bruggenolte ...... B60K 15/0409 220/230 |
| 7,841,315 B1 | | 11/2010 | Brister et al. |
| 2010/0089919 A1 | * | 4/2010 | Dunkle ............. B60K 15/0406 220/203.01 |
| 2015/0108131 A1 | * | 4/2015 | Malskorn ........... B60K 15/0409 220/295 |
| 2020/0024041 A1 | | 1/2020 | Niver |

* cited by examiner

PRESSURE CONTAINING/RELIEVING CAP FOR A LIQUIFIED NATURAL GAS RECEPTACLE

RELATED APPLICATIONS

This application claims the benefit of U.S. Provisional Application No. 63/031,123 filed May 28, 2020, which is hereby incorporated herein by reference in its entirety.

TECHNICAL FIELD

The present disclosure relates generally to a cap for forming a closure of an opening in a container, and more particularly to a pressure containing/relieving cap for pressurized containers, such as for use with liquified natural gas tank receptacles.

BACKGROUND

Liquified gases have become popular for use as a fuel in many industrial and commercial applications. For example, common uses of liquified gas includes use as a fuel for powering internal combustion engines in both commercial and private vehicles. Liquid natural gas (LNG) is a common gas for this purpose. The development of LNG as a fuel generally has been concentrated in the area of commercial vehicles, such as tractor trailers, delivery trucks, and mass transit vehicles. The LNG used in such applications is pressurized and extremely cold and, as such, thermal storage tanks have been developed to permit use of LNG as a fuel for such applications.

To refill the storage tank after depletion of the LNG, the storage tank includes a fill receptacle. Such fill receptacles typically include a valve and seal(s) to confine any gaseous natural gas to within the tank. Because of the cryogenic temperatures inside the tank, such seal(s) typically are non-elastomeric seals, which are commonly susceptible to contamination from debris. As such, simple caps have been developed to cover the receptacle to prevent ingress of debris.

SUMMARY

An aspect of the present disclosure provides a unique and improved cap for closing an opening of a receptacle such as for liquified natural gas containers.

More particularly, aspect(s) of the new and improved cap may include one or more of the following advantages over conventional caps: (1) improved locking functionality with the receptacle; (2) secondary sealing functionality to supplement the sealing of the main valve and/or seal(s) of the receptacle; (3) sensor functionality to ensure proper closure of the cap; (4) pressure relieving functionality to relieve trapped gases prior to removal of the cap from the receptacle; (5) measures to control the sequence of removal of the cap from the receptacle; and/or (6) measures to slow removal of the cap from the receptacle in the event of remnant pressure buildup behind the cap.

According to an aspect of the present disclosure, a cap for forming a closure in a receptacle of a container, includes: a valve configured to relieve trapped gas in the receptacle; and a catch configured to control movement of the cap during removal of the cap from the receptacle; the cap being configured such that: (i) in a first stage of removal of the cap from the receptacle, the valve is activatable to permit the trapped gas to vent from the receptacle while the cap remains secured to the receptacle; and (ii) in a second stage of removal of the cap from the receptacle, the cap is movable to an intermediate removal position in which the catch intercepts part of the receptacle to control movement of the cap before further removal of the cap from the receptacle.

According to another aspect of the present disclosure, a cap for forming a closure of an opening in a receptacle of container includes: a main body portion having a radially outer surface including a groove extending along the radially outer surface; a detent located in the groove; and a sealing surface radially inwardly of the radially outer surface of the main body portion for fluidly sealing the opening of the receptacle; wherein the groove is configured to receive a corresponding protrusion of the receptacle, and the detent is configured to hold the protrusion at a location within the groove when the cap is in a locked state on the receptacle.

According to another aspect of the present disclosure, a cap for forming a closure of an opening in a receptacle of a container includes: a main body portion having a radially outer surface including a stepped groove extending along the radially outer surface; a sealing surface radially inwardly of the radially outer surface of the main body portion for fluidly sealing the opening of the receptacle; wherein the stepped groove includes a first stepped surface having a detent which forms a stop that is configured to interact with a protrusion of the receptacle to prevent rotational movement of the main body portion relative to the receptacle, and wherein the stepped groove includes a second stepped surface at an elevation below the first stepped surface, the second stepped surface forming a catch that interacts with the protrusion to control removal of the cap from the receptacle.

According to another aspect of the present disclosure, a two-stage pressure relief and release cap for forming a closure of an opening in a receptacle of a container includes: a main body portion having a radially outer surface including a groove for receiving a corresponding protrusion of the receptacle, and a detent located in the groove for holding the protrusion and restricting rotation of the main body portion relative to the receptacle when the cap is in a locked state; a valve body portion within the main body portion, the valve body portion including a vent passage for relieving trapped gas in the receptacle; a valve member movable within the valve body between an open position in which the valve member opens the vent passage, and a closed position in which the valve member closes the vent passage; a valve actuator configured to operatively actuate the valve member between the open and closed position; and a grip at least partially supported by the valve actuator; wherein, in a first stage of removal of the cap from the receptacle, the grip is movable to a first position which causes activation of the valve actuator thereby causing actuation of the valve member to the open position, wherein in the first stage the detent maintains holding of the protrusion to maintain the locked state; and wherein, in a second stage of removal of the cap from the receptacle, the grip is movable to a second position which causes the main body portion to move relative to the receptacle thereby releasing the protrusion from the detent and enabling the cap to be removed from the receptacle.

According to another aspect, a method of removing a cap from a receptacle of a container, includes: (i) activating a valve of the cap to permit trapped gas to vent from the receptacle while the cap remains secured to the receptacle via a lock; (ii) moving the cap to an intermediate removal position in which a catch intercepts part of the receptacle to hold the cap at the intermediate removal position; and (iii) moving the cap away from the catch at the intermediate removal position and removing the cap from the receptacle.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles and aspects according to the present disclosure have particular application to liquified natural gas (LNG) containers, and thus will be described below chiefly in this context. It is furthermore understood, however, that the principles and aspects according to the present disclosure may be applicable to other pressurized containers, such as for other cryogenic fluids or for other applications, where it is desirable to provide one or more advantages over conventional caps used in such applications.

Figure 1:
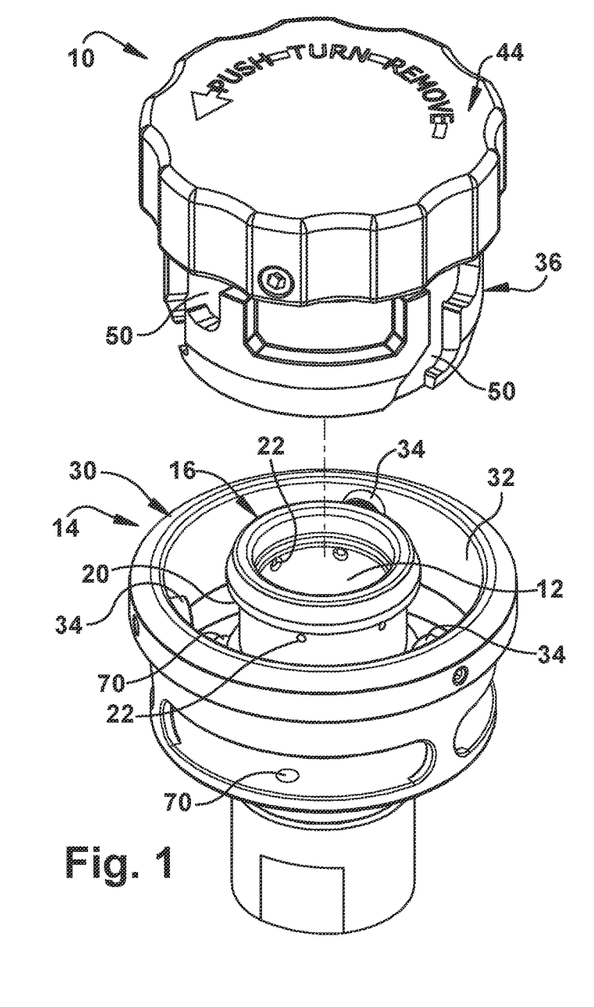
FIG. 1 is a perspective view of an exemplary receptacle and an exemplary cap for closing the receptacle according to an embodiment of the present disclosure.
Figure 2:
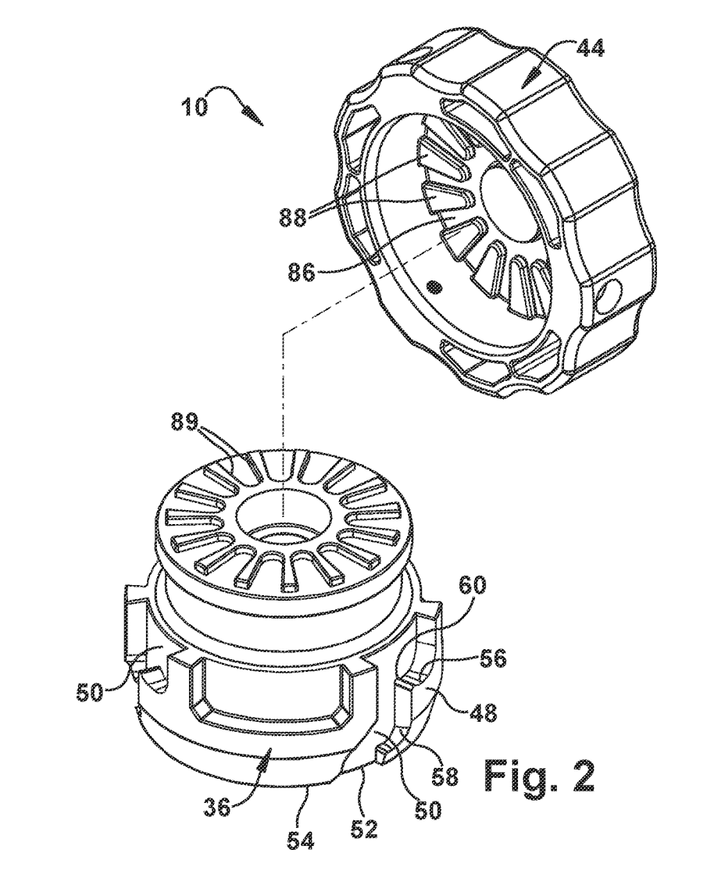
FIG. 2 is a perspective view of the exemplary cap shown with the grip portion and main body portion separated from each other.
Figure 3:
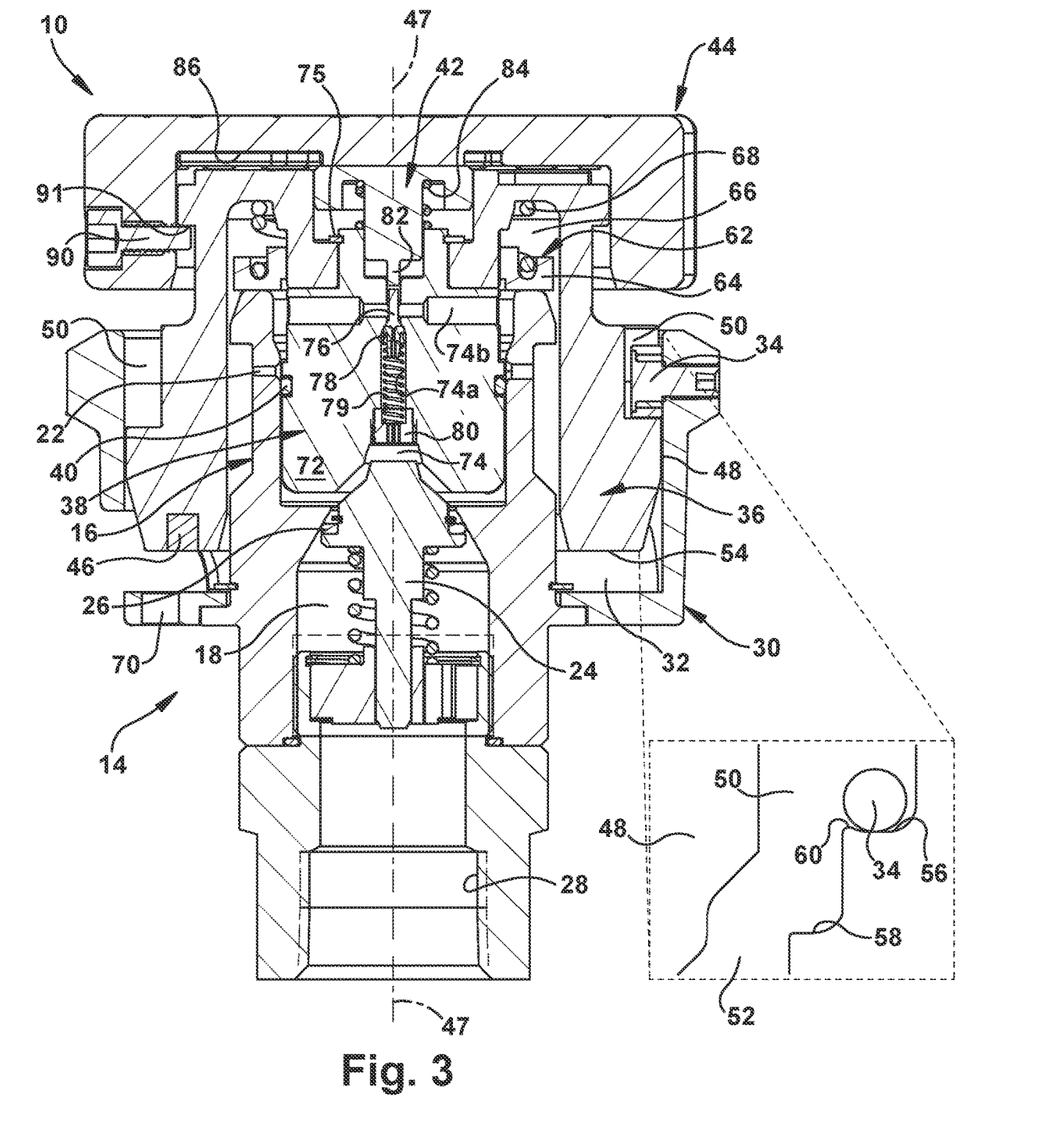
FIG. 3 is a cross-sectional side view showing the exemplary cap in a fully coupled and locked state on the receptacle.

Referring initially to FIGS. 1-3, an exemplary cap 10 is shown for closing an opening 12 in an exemplary receptacle 14 of a pressurized LNG container (not shown). As shown, the receptacle 14 generally includes a tube portion 16 that includes the opening 12 and forms an inlet passage 18 for fluid communication with the container. A lip 20 is provided at an upper portion of the tube portion 16, which may be used for gripping the tube portion 16 by a corresponding coupling of a fill conduit (not shown) during filling of the container. The tube portion 16 also includes radial through-passages 22 below the lip 20 for allowing venting of trapped gases. Referring briefly to the cross-sectional view in FIG. 3, the tube portion 16 includes a valve member 24 having one or more seal(s) 26 for sealing the inlet passage 18 and confining gases and internal pressure to within the container. As shown, the receptacle 16 may include a suitable connector 28, such as a threaded bore, for fluidly connecting the receptacle 16 to the container.

As shown in the illustrated embodiment, a radially outer rim portion 30 is provided to surround the tube portion 16 of the receptacle 16, which forms an annular space 32 between the tube portion 16 and the rim portion 30. The annular space 32 forms a socket opening which is adapted to receive the corresponding coupling of the fill conduit for filling the container. As shown, one or more protrusions 34 are provided that protrude into the annular space 32 from a radially inner surface of the rim portion 30. In the illustrated embodiment, these protrusions 34 include rollers which are mounted on studs that extend radially into the rim portion 30. These protrusions 34 (e.g., rollers) generally are provided to be guidably received into the coupling of the fill conduit and facilitate locking functionality with the conduit coupling during filling of the LNG container. It is understood that although the protrusions 34 in the form of rollers are shown for interacting with a main body of the cap 10 (e.g., via slots or grooves), other portions of the receptacle 14 (e.g., lip 20, rim portion 30, etc.) also could interact with other portions of the cap 10 to provide the same functionality as described below. Alternatively or additionally, the cap 10 may include protrusions that interact with portions (such as slots or grooves) in the receptacle 14.

Referring particularly to FIG. 3, and also to FIGS. 1 and 2, the exemplary cap 10 will now be described in further detail. In the illustrated embodiment, the cap 10 is shown in an exemplary locked state on the receptacle 14 and forms a closure of the receptacle opening(s) 18, 22 to prevent any pressurized gas from escaping from the receptacle 14 and/or container. Such a closure may be particularly beneficial where the main valve 24 of the receptacle 14 is faulty and is susceptible to leakage of gas from the container. Such a closure also prevents ingress of contaminants, such as debris, from interacting with the valve member 24 and/or seal(s) 26 of the receptacle 14.

As shown, the cap 10 generally includes a main body portion 36 that is adapted to fit within the annular space 32 of the receptacle 14 and surround the tube portion 16. In exemplary embodiments, a relief valve portion 38 of the cap 10 is provided which is configured to fit within the opening 12 of the receptacle 14, and which includes one or more sealing surfaces 40 for sealing the inlet passage 18 of the receptacle downstream of the receptacle valve member 24 (in the direction of leaking gas). In the illustrated embodiment, the cap 10 includes a valve actuator 42 that is activatable to actuate the relief valve 38 to relieve pressure within the receptacle 14. A grip portion 44 of the cap 10 overlies the main body portion 36 and the valve actuator 42. The grip portion 44 is provided to enable a user to activate the relief valve 38 via the actuator 42 and to apply torque to the main body portion 36 to couple or decouple the cap 10 from the receptacle 10. In exemplary embodiments, a lock/release mechanism of the cap 10 also is provided to lock the cap 10 onto the receptacle 14 or enable the cap 10 to be removed from the receptacle 14, as described in further detail below. In addition, one or more magnets 46 may be provided in the main body portion 36 of the cap 10 which may be used for proximity sensors to indicate proper closure by the cap 10 on the receptacle 14.

As shown in the illustrated embodiment, the main body portion 36 has a generally cylindrical shape and extends along a longitudinal axis 47 between an upper end and a lower end of the main body portion 36. In exemplary embodiments, a radially outer surface 48 of the main body portion 36 includes one or more surface grooves 50 that are configured to receive the corresponding protrusion(s) 34 (e.g., rollers) of the receptacle 14. In the illustrated embodiment, for example, a plurality of grooves 50 (e.g., three grooves) are provided circumferentially spaced apart from each other to receive each of the circumferentially spaced apart protrusions 34 (e.g., three protrusions) of the receptacle 14. As shown, each groove 50 has an opening 52 through a bottom surface 54 of the main body portion 36 for enabling the protrusion 34 to enter into the groove 50. The grooves 50 generally extend in a vertical and circumferential direction along the radially outer surface 48, such that axial insertion or removal of the cap 10 from the receptacle 14 corresponds with rotational movement of the cap 10 relative to the receptacle 14. In exemplary embodiments, the grooves 50 include one or more stepped surfaces 56, 58, which are provided for locking and/or controlling removal of the cap 10 from the receptacle 14, as described in further detail below.

In exemplary embodiments, the locking mechanism of the cap 10 (also referred to as the lock) includes a lock portion, such as at least one stop 60 located in one or more of the groove(s) 50. In the illustrated embodiment, the stop 60 is configured as a detent (also 60). The at least one detent 60 is configured to capture and hold the protrusion 34 of the receptacle 14 at a location within the groove 50 when the cap 10 is in a locked state on the receptacle 14. In the illustrated embodiment, each groove 50 includes a corresponding detent 60. As shown in the two-dimensional inset view of FIG. 3, the detent 60 may be formed as a ridge in the surface 48 forming the groove 50. In the illustrated embodiment, for example, the detent 60 (e.g., ridge) is formed at the edge of a first stepped surface 56 of the groove 50. The detent 60 (e.g., ridge) forms the stop that interacts with the protrusion 34 to prevent rotational movement of the main body portion 36 relative to the receptacle 14, and thereby holds the protrusion 34 on the stepped surface 56 in the groove 50. The axial location of the stepped surface 56 and/or detent 60 in the groove 50 relative to the longitudinal axis 47 of the cap 10 corresponds with the fully closed and sealed state of the cap 10 on the receptacle 14 in the illustrated locked state.

In exemplary embodiments, the locking mechanism of the cap 10 also includes a lock/release actuator 62 that is configured to facilitate holding of the protrusion 34 by the detent 60 in the groove 50 when in the locked state. In the illustrated embodiment, for example, the lock/release actuator 62 includes a biased plate or ring 64 disposed in an internal annulus 66 of the cap 10 between the relief valve portion 38 and a radially inner surface of the main body portion 36. As shown, the actuator ring 64 is biased downwardly by a biasing member 68, such as a spring (e.g., coil spring). The actuator ring 64 is configured to engage an end surface of the tube portion 16 of the receptacle 14 to urge the actuator ring 64 upwardly against a biasing force of the biasing member 68 when the user is coupling the cap 10 to the receptacle 14. In the illustrated locking state of the lock/release actuator 62, the biasing member 68 (e.g., spring) is in a compressed state to provide biasing force that tends to push the cap 10 upwardly away from the receptacle 14. This enables the stepped surface 56 and detent 60 to lockingly hold the protrusion 34 of the receptacle in the groove 50. As will be described in further detail below, the lock/release actuator 62 is activatable by the user to a releasing state that enables the protrusion 34 to be released from the detent 60 in the groove 50, thereby enabling removal of the cap 10 from the receptacle 14.

As mentioned above, one or more magnets 46 may be provided in the main body portion 36 which may be used for proximity sensors to indicate proper closure by the cap 10 on the receptacle 14. In exemplary embodiments, at least one magnet 46 is provided for each of the grooves 50 such that cap 10 is orientation-agnostic as it relates to which protrusion 34 is received in which groove 50. Generally, the magnets 46 are configured to align with corresponding sensors 70 in the receptacle 14 (also shown in FIG. 1, for example), which may be circumferentially spaced apart at locations between the protrusions 34. Accordingly, the magnets 46 of the cap 10 are disposed in a lower portion of the main body portion 36 and are circumferentially spaced apart between the respective grooves 50 to correspond with the locations of the sensors 70 when the cap 10 is in the fully coupled and locked state (as shown in FIG. 3).

As shown in the illustrated embodiment, the relief valve portion 38 of the cap 10 includes the sealing surface 40 in the form of a seal 40 within a radial groove. The seal 40 may be any suitable seal, such as an O-ring elastomeric seal, or a non-elastomeric seal suitable for cryogenic applications, for example. The seal 40 fluidly seals the axial inlet passage 18 and opening 12 of the receptacle 14 from egress of gas when in the fully coupled and locked state. As shown, the axial location of the seal 40 relative to the longitudinal axis 47 is such that the seal 40 is below (e.g., upstream) of the radial through passages 22 in the receptacle tube portion 16 when the cap is in the fully coupled and locked state to also seal the radial through passages 22.

In exemplary embodiments, the relief valve portion 38 includes a valve body 72 having a vent passage 74 that is in fluid communication with the inlet passage 18 of the receptacle 14 for relieving internal pressure in the receptacle 14 and/or container. In the illustrated embodiment, the valve body 72 is fixed to the main body portion 36 with a retaining ring 75. As shown, a valve member 76 is movable within the valve body 72 between an open position (shown in FIG. 4, for example), in which the valve member 76 opens the vent passage 74, and a closed position (shown in FIG. 3), in which the valve member 76 closes the vent passage 74. In the illustrated embodiment, the valve member 76 is formed as a valve pin that is axially movable in an axial portion 74a of the vent passage 74. The valve member 76 has a sealing surface, such as a suitable seal 78, which engages or disengages a valve seat in the valve body 72 to close or open the vent passage 74. The valve member 76 is biased toward the closed position by a valve biasing member 79, such as a spring. The valve biasing member 79 is contained within the axial portion 74a of the vent passage by a nut 80 having an axial through passage. In the illustrated embodiment, a lower portion of the vent passage 74 is laterally widened and configured to fit a nose portion of the receptacle valve member 24. As shown, the vent passage 74 may include one or more radial portions 74b that fluidly connect with the axial portion 74a of the vent passage 74 to allow gases to escape to atmosphere.

Figure 4:
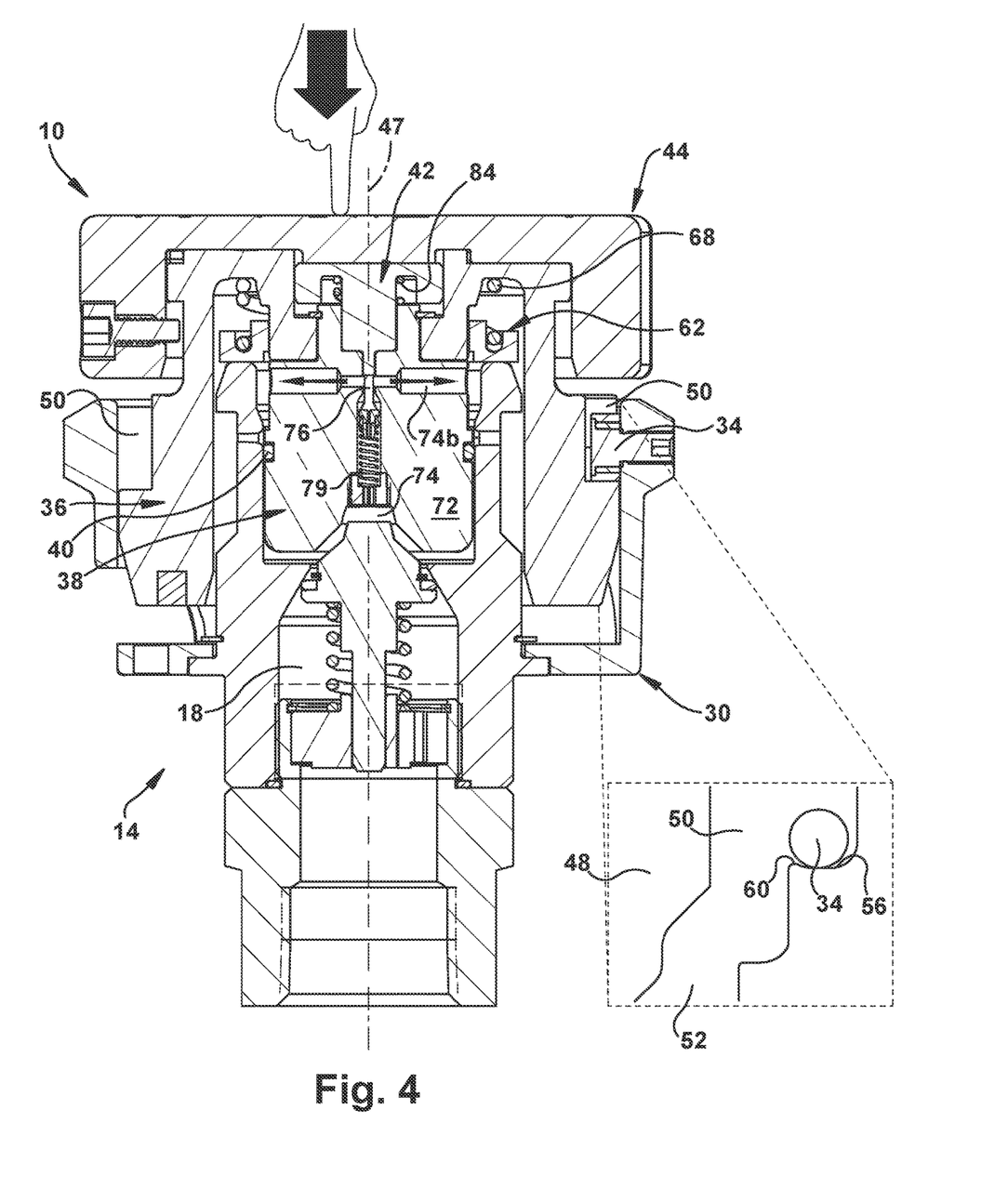
FIG. 4 is a cross-sectional side view showing an exemplary first stage of removal of the cap in which the grip portion is depressed, an exemplary relief valve is activated, and the cap maintains the locked state with the receptacle.

The valve actuator 42 is configured to operatively actuate the valve member 76 between its open and closed positions. In the illustrated embodiment, the valve actuator 42 is configured as a depressible member, such as a button, that moves axially between an activated position, which corresponds with actuating the valve member 76 to open (as shown in FIG. 4, for example), and a deactivated position, which corresponds with enabling the valve member 76 to close (as shown in FIG. 3, for example). The valve actuator 42 may include a contact portion, such as a pin 82, that is configured to contact a nose of the valve member 76 when activated (e.g., FIG. 4), and is configured to disengage from the nose of the valve member 76 when deactivated (e.g., FIG. 3).

In the illustrated embodiment, the valve actuator 42 is biased upwards toward the deactivated position by an actuator biasing member 84, such as a spring (e.g., coil spring). The actuator biasing member 84 provides a first biasing force that is needed to be overcome to activate the valve actuator 42. The valve biasing member 79 provides a second biasing force that also is needed to be overcome to move the valve member 76 to open thereby activating the relief valve 38. Accordingly, in the illustrated embodiment the biasing members 84, 79 together provide a preset force that is needed to activate the relief valve 38 for relieving pressure from the system.

Figure 5:
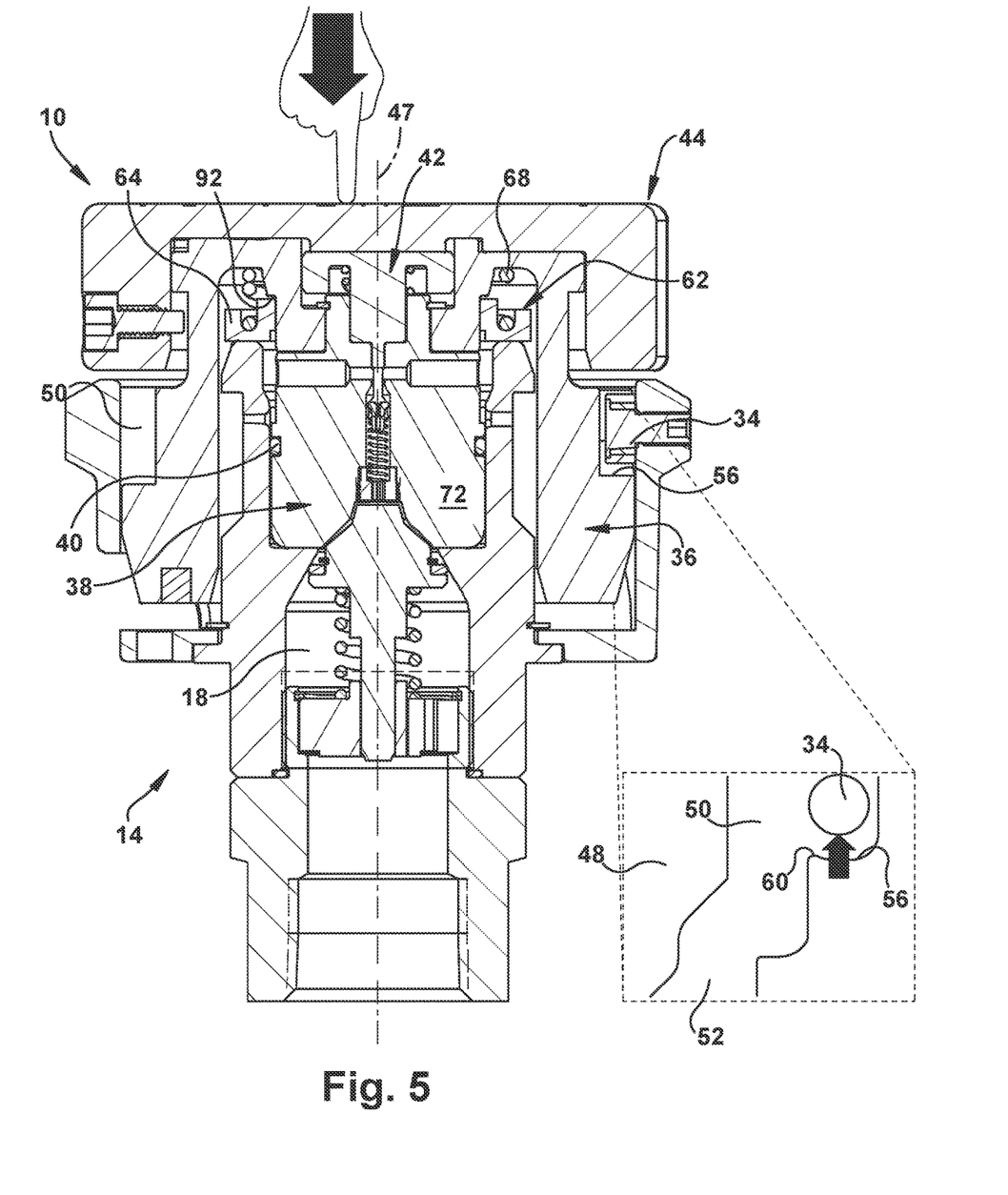
FIG. 5 is a cross-sectional side view showing an exemplary second stage of removal of the cap in which the grip portion is further depressed to unlock the cap from the receptacle.
Figure 6:
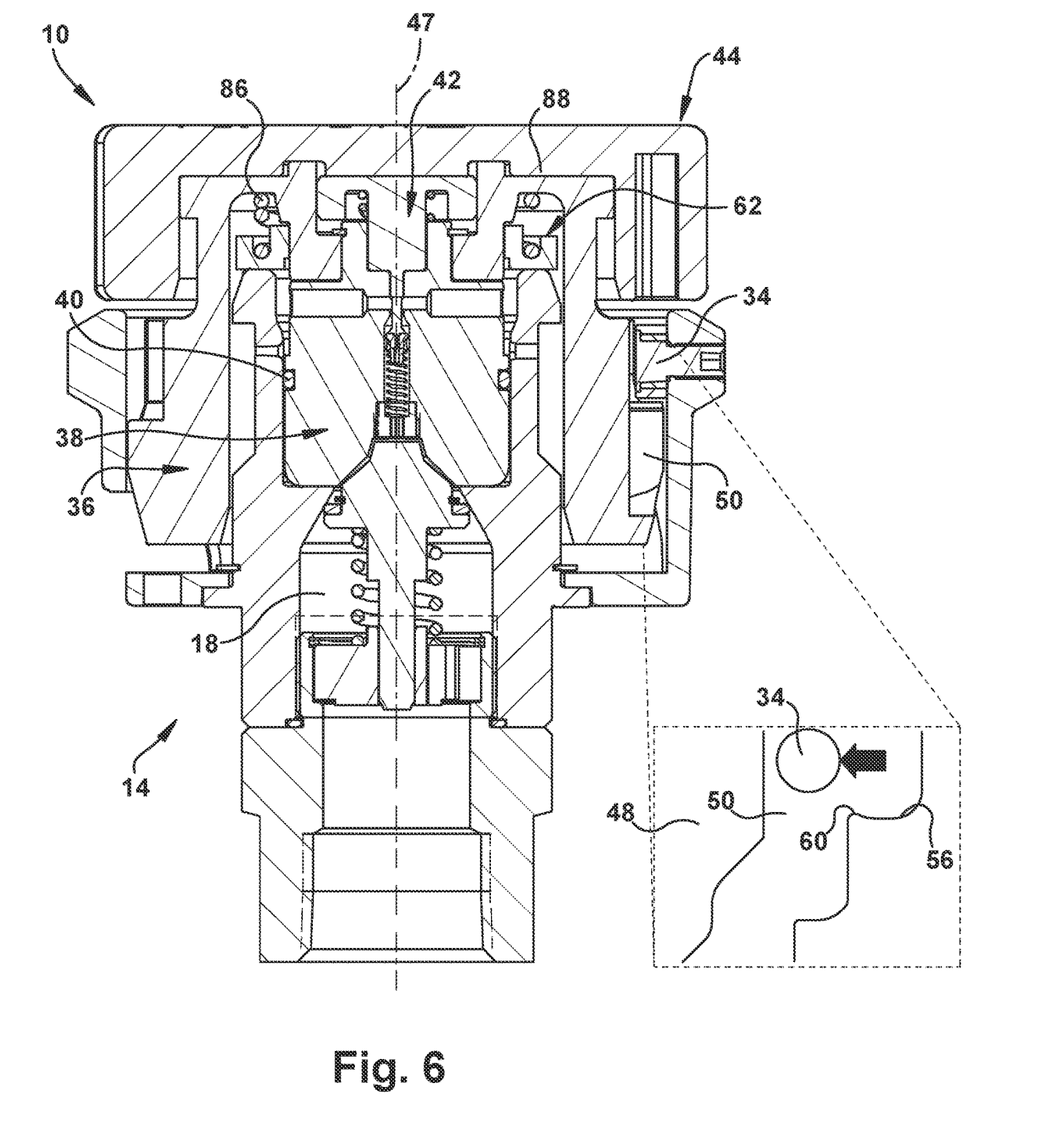
FIG. 6 is a cross-sectional side view showing the cap unlocked and rotated relative to the receptacle during removal.

In exemplary embodiments, the grip portion 44 (also referred to as the grip 44) is supported by the valve actuator 42 in the deactivated (e.g., non-depressed state). As shown, this enables a bottom surface 86 of the grip 44 to be axially spaced from the main body portion 36. In exemplary embodiments, the grip 44 forms a clutch mechanism with the main body portion 36, such that the grip 44 is freely rotatable about the main body portion 36 when the grip 44 is in a non-depressed state (as shown in FIG. 3), and is configured to engage the main body portion 36 and enable transfer of torque to the main body portion 36 when the grip 44 is in a depressed state via depressing the valve actuator 42 (as shown in FIGS. 4-6, for example). In the illustrated embodiment, the clutch mechanism includes a plurality of grip lugs 88 on the bottom surface 86 of the grip 44 (as shown in FIG. 2). The grip lugs 88 are configured to interlock and interface with respective main body lugs 89 on a top surface of the main body portion 36 when the grip 44 is depressed. As shown, the grip 44 includes a connector 90, such as a set screw (e.g., dog-point cap screw), which is configured to engage a lip 91 of the main body portion 36 and enables free rotation of the grip 44 relative to the main body portion 36 when in the disengaged state. This prevents a user from applying torque to unlock the cap 10 without depressing the grip 44 and activating the valve actuator 42. The grip 44 forms a top cover of the cap 10 and has a suitable diameter (e.g., between 3.0 in. to 5.0 in., for example) that enables the user to grasp the grip 44 and apply torque to unlock the cap 10. The grip 44 may include scallops, ridges or other surface artifacts around its circumferential outer perimeter to facilitate grasping the grip 44. Written instructions may be provided on top of the grip 44 to instruct the user how to use the cap 10.

Referring now to FIGS. 4-8, an exemplary operation of disconnecting the cap 10 from the receptacle 14 will now be described. Turning initially to FIG. 4, in a first stage of removal of the cap 10 from the receptacle 14, a user depresses the grip 44 axially downwardly to activate the valve actuator 42 and thereby activate the relief valve 38 to relieve any gas pressure behind the cap 10 in the receptacle 14. As shown in the illustrated embodiment, depressing the grip 44 downwardly with sufficient force overcomes the biasing force of the actuator biasing member 84. As the valve actuator 42 moves axially to engage the valve member 76, the user's force also overcomes the biasing force of the valve biasing member 79 to move the valve member 76 to the open position, allowing gas to vent via the vent passage 74 (as shown with directly flow arrows in radial flow passages 74b). The preset force provided by the biasing members 79, 84 may be any suitable force that is enabled to be overcome by the user to activate the relief valve 38, such as a force in the range from about 5 lbf to about 10 lbf, for example.

As shown in the illustrated first stage of removal, the lock/release actuator 62 still is in its locked state such that the detents 60 in the grooves 50 still maintain holding of the protrusions 34 to prevent rotation of the cap 10 (as shown in the two-dimensional inset view of FIG. 4). This is because the biasing member 68 of the lock/release actuator 62 is set with a higher biasing force than that of the combined forces provided by the actuator biasing member 84 and the valve biasing member 79. In this manner, the cap 10 is configured to control the sequence of removal of the cap 10 from the receptacle 14 such that the pressure relieving function is carried out first before unlocking and removing the cap 10.

Turning to FIG. 5, a second stage of removal of the cap 10 is shown in which the grip 44 is further axially depressed beyond the position shown in FIG. 4. In this second stage of removal, the user overcomes the biasing force provided by the biasing member 68 of the lock/release actuator 62 such that the lock/release actuator 62 is now in its releasing state. The protrusion 34 has not yet cleared the detent 60 rotationally, and thus FIG. 5 is referred to as an intermediate release position in a first release state of the lock. Further depression of the grip 44 in this way allows the main body portion 36 to move axially relative to the receptacle 14. As shown in the two-dimensional inset view in FIG. 5, such axial movement of the main body portion 36 allows the protrusion 34 to move axially in the groove 50 to release from the detent 60, thereby enabling the cap 10 to be rotated. The preset force provided by the lock/release biasing member 68 in this second stage may be any suitable force that is enabled to be overcome by the user to unlock the cap, such as a force in the range from greater than about 10 lbf to about 25 lbf. As shown, one or more suitable stops are provided to prevent further downward movement of the cap 10 beyond a predetermined point. For example, in the illustrated embodiment, a shoulder 92 of the main body portion 36 forms a stop to the movement of the actuator ring lock/release actuator 62. In addition, the length of the valve body 72 may be sized to stop against an inner shoulder 93 of the receptacle 14.

Turning to FIG. 6, with the protrusions 34 released from the detents 60 in the grooves 50, each protrusion 34 can clear each detent 60 to move to a circumferentially offset position in the groove 50 (as shown in the two-dimensional inset view) when the cap 10 is rotated by the user. As such, this position is referred to as a fully-released position in a second release state of the lock. In the illustrated state, the clutch mechanism is activated by the user depressing the grip 44, which enables torque to be transferred from the grip 44 to the main body portion 36 enabling co-rotation together. In the illustrated embodiment, the activation of the clutch mechanism is provided by the grip lugs 88 interlocking and interfacing with the main body lugs 89 to enable such transfer of torque from the input of the user.

Figure 7:
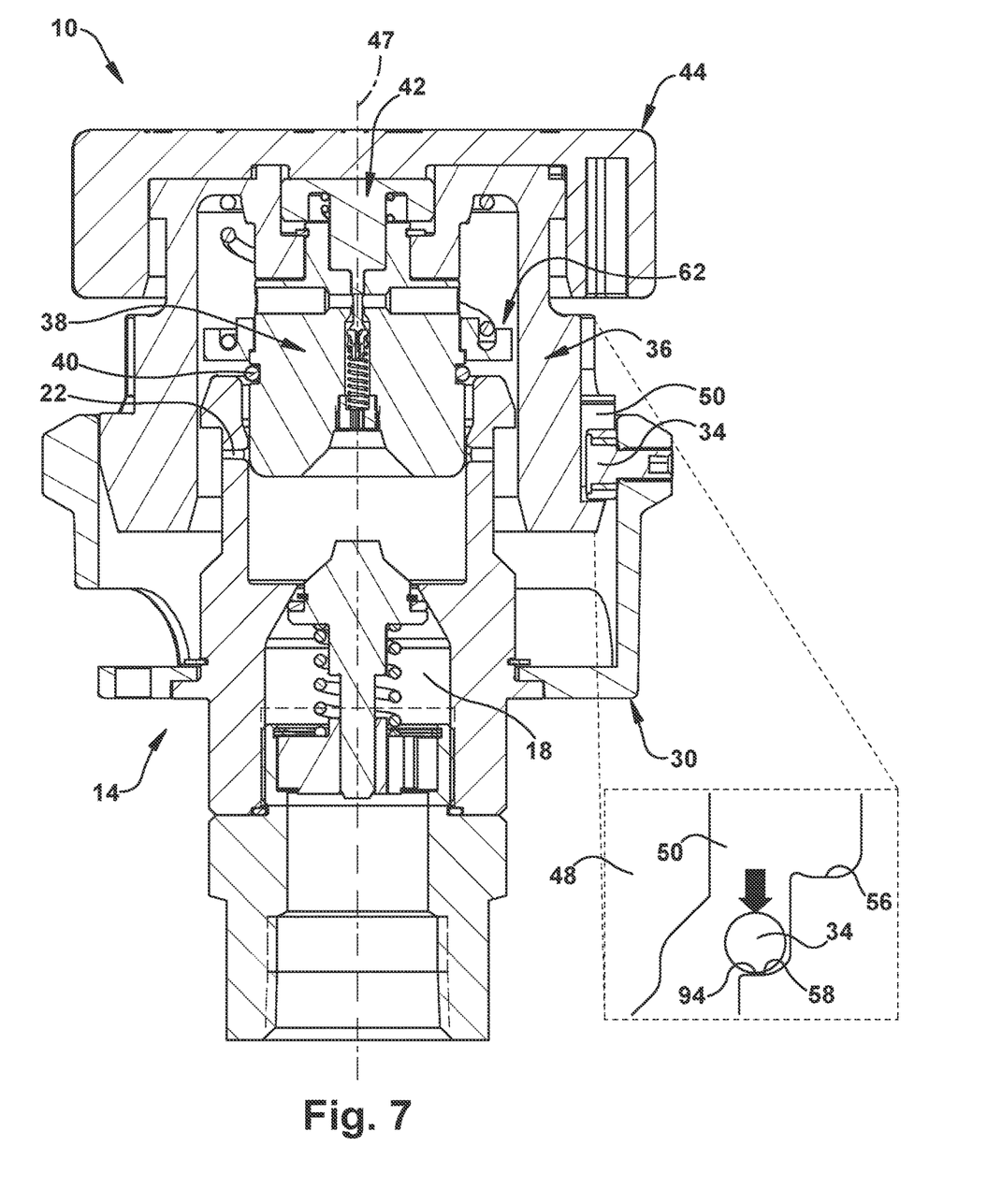
FIG. 7 is a cross-sectional side view showing an exemplary intermediate catch position of the cap on the receptacle during removal.

Turning to FIG. 7, and particularly to the two-dimensional inset view, an exemplary catch 94 is shown in the groove 50, which is configured to intercept and interact with the protrusion 34 and control (e.g., slow) removal of the cap 10. Such a catch 94 is particularly useful in the event that remnant pressure behind the cap 10 was not fully vented during the first stage of pressure relief, in which case the catch 94 can prevent the cap 10 from being released too quickly. As such, the catch position having the catch 94 also is referred to as an intermediate removal position of the cap. In the illustrated embodiment, the catch 94 is formed as the second stepped surface 58 of the groove 50 which is at an elevation below the first stepped surface 56, and is circumferentially offset relative to the second stepped surface 56. The cap 10 is configured to freely move axially from the release position in FIG. 6 to the catch 94 at the intermediate removal position (i.e., catch position) without rotation of the cap 10. In exemplary embodiments, the second stepped surface 58 does not contain a ridge or other such detent, such that the user can simply continue rotation of the cap 10 for further removal.

Still referring to FIG. 7, and in particular with a comparison to FIG. 3, the exemplary cap 10 includes a secondary pressure relief feature that enables further venting of gas pressure behind the cap 10 when the cap is moved axially upward from the locked position (FIG. 3) to the catch position (FIG. 7). Such a feature is particularly beneficial if remnant gas pressure remains behind the cap 10 after the first stage of pressure relief. In exemplary embodiments, such secondary pressure relief is provided by locating the seal 40 of the cap 10 at a specified axial distance relative to the radial through passages 22 in the receptacle 14, such that a specified amount of upward axial movement of the cap 10 moves the seal 40 downstream of the radial through passages 22 to allow the remnant gas to vent. In the illustrated embodiment, the axial distance between the seal 40 and the radial through passages 22 when the cap 10 is in the locked state (FIG. 3) is less than the axial distance between the first (locking) stepped surface 56 and the second (catching) stepped surface 56. In this manner, when the protrusion 34 moves axially from the lock position (FIG. 3) to the catch position (FIG. 7) with the main body portion 36 moving upwardly, the seal 40 moves upwardly with the valve body 38 (fixed to the main body portion 36) by the distance between the steps 56, 58 which allows the seal 40 to clear the radial through passages 22. Thus, the user can continue removal of the cap 10 from the catch position with most if not all of the remnant gas behind the cap 10 having been relieved.

Figure 8:
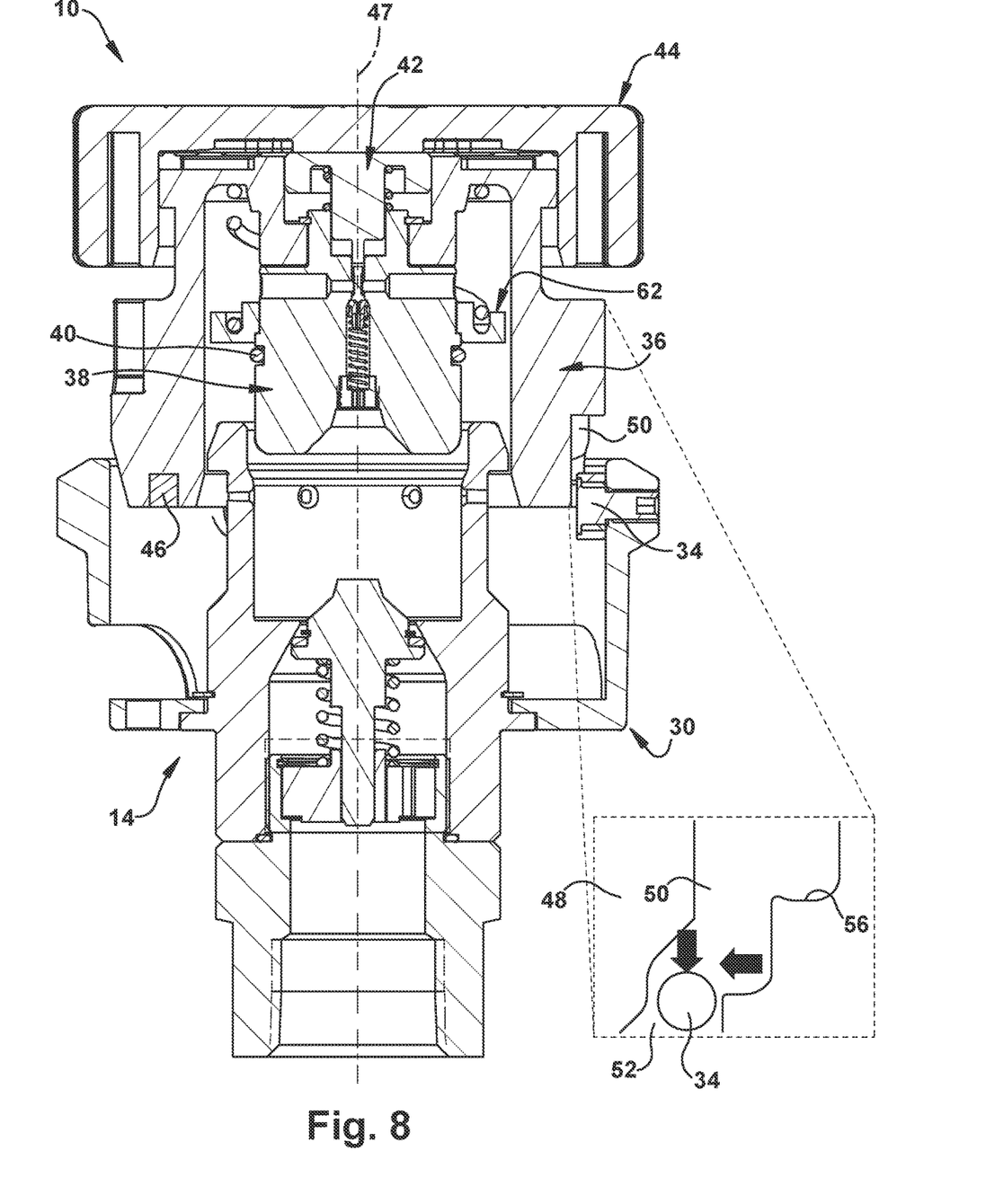
FIG. 8 is a cross-sectional side view showing the exemplary cap just prior to removal from the receptacle.

Turning to FIG. 8, a final step of removing the cap 10 from the receptacle 14 is shown. In the illustrated state, the user has further rotated the cap 10 via the grip 44 to cause the protrusions 34 to move circumferentially off of the second (catching) stepped surfaces 58 of the grooves 50 (as shown in the two-dimensional inset view). The user can then lift the cap 10 axially off of the receptacle 14 by allowing the protrusions 34 to pass through the openings 52 in the bottoms of the grooves 50. To connect the cap 10 onto the receptacle 14, the steps of the exemplary operation are essentially reversed to where the protrusions 34 move through the grooves 50 to be locked in place by the detents 60.

An exemplary cap has been described herein for closing one or more openings of a receptacle, such as for a liquefied natural gas container. The exemplary cap includes a main body and a sealing surface for sealing the opening of the receptacle. A lock/release mechanism is provided to lock the exemplary cap onto the receptacle, or enable the cap to be removed from the receptacle. A relief valve of the cap is activatable to relieve pressure within the receptacle. A grip overlies the main body and a relief valve actuator, enabling a user to activate the relief valve via the grip. The cap may be configured to relieve pressure in a first stage of removal, and then unlock from the receptacle in a second stage of removal. A catch and secondary pressure relief features may be provided to control removal of the cap. Magnets may be provided for proximity sensors to indicate proper closure of the cap on the receptacle.

An aspect of the present disclosure provides a unique and improved cap for closing an opening of a receptacle such as for liquified natural gas containers.

Another aspect of the present disclosure provides a cap with improved locking functionality with the receptacle compared to conventional caps.

Another aspect of the present disclosure provides a cap with secondary sealing functionality to supplement the sealing of the main valve and/or seal(s) of the receptacle.

Another aspect of the present disclosure provides a cap with sensor functionality to ensure proper closure of the cap.

Another aspect of the present disclosure provides a cap with pressure relieving functionality to relieve trapped gases prior to removal of the cap from the receptacle.

Another aspect of the present disclosure provides a cap with measures to control the sequence of removal of the cap from the receptacle.

Another aspect of the present disclosure provides a cap with measures to slow removal of the cap from the receptacle in the event of remnant pressure buildup behind the cap.

According to an aspect of the present disclosure, a cap for forming a closure in a receptacle of a container, includes: a valve configured to relieve trapped gas in the receptacle; and a catch configured to control movement of the cap during removal of the cap from the receptacle; the cap being configured such that: (i) in a first stage of removal of the cap from the receptacle, the valve is activatable to permit the trapped gas to vent from the receptacle while the cap remains secured to the receptacle; and (ii) in a second stage of removal of the cap from the receptacle, the cap is movable to an intermediate removal position in which the catch intercepts part of the receptacle to control movement of the cap before further removal of the cap from the receptacle.

Embodiments may include one or more features of the foregoing aspects, separately or in any combination, which may be combined with one or more of the following additional features, which may be included separately or in any combination.

In some embodiments, the cap further comprises a lock that is operative in at least (i) a locked state to secure the cap to the receptacle, and (ii) a release state to enable the cap to be removed from the receptacle; and wherein the cap is configured such that in the locked state: (i) the valve is activatable to vent trapped gas, and (ii) the lock prevents transition to the second stage of removal without first achieving the release state of the lock.

In some embodiments, the cap is configured such that axial movement of the cap by a predetermined axial amount and rotational movement by a predetermined rotational amount permits transition of the lock from the lock state to the release state at a release position.

In some embodiments, the lock interacts with part of the receptacle via a stop at a lock position to provide the lock state, and the part of the receptacle releases from the stop at a release position to provide the release state.

In some embodiments, the catch is at the intermediate removal position which is circumferentially and axially offset from the lock position and axially offset from the release position, the cap being configured to freely move axially from the release position to the catch at the intermediate removal position without rotation of the cap, and wherein the catch is configured to hold the cap at the intermediate removal position.

In some embodiments, the cap is configured such that at least rotational movement of the cap from the intermediate removal position by a predetermined amount enables removal of the cap from the receptacle.

In some embodiments, the lock and catch are formed in a groove of the cap or by respective parts of a groove of the cap.

In some embodiments, the cap includes a stepped groove in a body of the cap, the stepped groove including a first stepped surface having a a stop that forms at least a part of the lock, the stop being configured to interact with a part of the receptacle to restrict rotational movement of the body of the cap relative to the receptacle.

In some embodiments, the stepped groove includes a second stepped surface at an elevation below the first stepped surface, the second stepped surface forming the catch which is configured to interact with the part of the receptacle to intercept and control removal of the cap from the receptacle.

In some embodiments, the stop is formed as a detent in the form of a ridge at an edge of the first stepped surface.

In some embodiments, the cap further comprises a sealing surface configured to fluidly seal an opening of the receptacle.

In some embodiments, the second stepped surface is axially spaced from the first stepped surface by a first axial distance.

In some embodiments, when the cap is in the locked state on the receptacle, the sealing surface is axially spaced from a radial through passage of a receptacle by a second axial distance.

In some embodiments, the second axial distance is less than the first axial distance, such that when the cap is axially moved during removal and the protrusion moves from the first stepped surface to the second stepped surface, the sealing surface moves past the radial through passage enabling the receptacle to vent trapped gas.

In some embodiments, the valve includes a valve body having a vent passage, and a valve member movable in the valve body to open and close the vent passage, wherein the valve body is radially inwardly spaced from an internal surface of a main body portion of the cap to form an annulus therebetween, and wherein the receptacle is fittable within the annulus such that the valve body is disposed within the opening of the receptacle when the cap is in the locked state on the receptacle.

In some embodiments, the cap further includes: a valve actuator that is depressible to activate the valve.

In some embodiments, the cap further includes: a grip overlying a main body portion and the valve actuator, the grip being supported by the valve actuator at least in a non-depressed state, and wherein depressing the grip with a force greater than a preset force causes the valve actuator to depress and activate the valve.

In some embodiments, the grip is axially depressible to the a first position to axially move the actuator and thereby axially move the valve member to the open position.

In some embodiments, the grip is further axially depressible to a second position beyond the first position to axially move the main body portion relative to the receptacle such that an part of the receptacle axially moves in the groove to release from a stop, thereby enabling the cap to be rotated whereby the protrusion can clear the stop during rotation and enable removal of the cap.

In some embodiments, the grip forms a clutch mechanism with the main body portion, such that grip is freely rotatable about the main body portion when the grip is in a non-depressed state, and engages and transfers torque to the main body portion when the grip is in a depressed state.

In some embodiments, the grip includes a plurality of grip lugs, the grip lugs being configured to interface with respective main body lugs on the main body portion when the grip is in the depressed state.

In some embodiments, the cap further comprising a lock/release actuator configured to effect holding of a part of the receptacle by the lock a locking state of the lock/release actuator, and configured to effect releasing of the part of the receptacle from the lock in the groove in a releasing state of the lock/release actuator.

In some embodiments, in the first stage of removal, the lock/release actuator is in the locking state; and wherein, in the second stage of removal, the lock/release actuator is in the releasing state.

In some embodiments, the valve actuator includes a first biasing member having a first biasing force that constitutes at least a portion of a first preset force for activating the valve actuator and thereby actuation of the valve member to the open position.

In some embodiments, the lock/release actuator includes a second biasing member having a second biasing force that constitutes at least a portion of a second preset force for releasing the protrusion from the detent.

In some embodiments, the second preset force is greater than the first preset force.

In some embodiments, the main body portion includes a plurality of grooves circumferentially spaced apart about the radially outer surface for receiving a respective plurality of protrusions of the receptacle, and a detent is located in each of the plurality of grooves for receiving a corresponding protrusion of the plurality of protrusions.

In some embodiments, the cap further comprises a plurality of magnets located at a bottom portion of the main body portion for a proximity sensor, the plurality of magnets being circumferentially spaced apart between the plurality of grooves, and wherein each groove of the plurality of grooves has associated therewith at least one corresponding magnet of the plurality of magnets.

In some embodiments, the cap further comprising: a main body portion having a radially outer surface including a groove for receiving a corresponding protrusion of the receptacle, and a detent located in the groove for holding the protrusion and restricting rotation of the main body portion relative to the receptacle when the cap is in a locked state; a valve body portion within the main body portion, the valve body portion including a vent passage for relieving trapped gas in the receptacle; a valve member movable within the valve body between an open position in which the valve member opens the vent passage, and a closed position in which the valve member closes the vent passage; a valve actuator configured to operatively actuate the valve member between the open and closed position; a grip at least partially supported by the valve actuator; wherein, in a first stage of removal of the cap from the receptacle, the grip is movable to a first position which causes activation of the valve actuator thereby causing actuation of the valve member to the open position, wherein in the first stage the detent maintains holding of the protrusion to maintain the locked state; and wherein, in a second stage of removal of the cap from the receptacle, the grip is movable to a second position which causes the main body portion to move relative to the receptacle thereby releasing the protrusion from the detent and enabling the cap to be removed from the receptacle; and the cap further comprising a lock/release actuator configured to effect holding of the protrusion by the detent in the groove in a locking state of the lock/release actuator, and configured to effect releasing of the protrusion from the detent in the groove in a releasing state of the lock/release actuator; wherein, in the first stage of removal, the lock/release actuator is in the locking state; and wherein, in the second stage of removal, the lock/release actuator is in the releasing state; wherein the valve actuator includes a first biasing member having a first biasing force that constitutes at least a portion of a first preset force for activating the valve actuator and thereby actuation of the valve member to the open position; wherein the lock/release actuator includes a second biasing member having a second biasing force that constitutes at least a portion of a second preset force for releasing the protrusion from the detent; and wherein the second preset force is greater than the first preset force.

According to another aspect of the present disclosure, a cap for forming a closure of an opening in a receptacle of container includes: a main body portion having a radially outer surface including a groove extending along the radially outer surface; a detent located in the groove; and a sealing surface radially inwardly of the radially outer surface of the main body portion for fluidly sealing the opening of the receptacle; wherein the groove is configured to receive a corresponding protrusion of the receptacle, and the detent is configured to hold the protrusion at a location within the groove when the cap is in a locked state on the receptacle.

According to another aspect of the present disclosure, a cap for forming a closure of an opening in a receptacle of a container includes: a main body portion having a radially outer surface including a stepped groove extending along the radially outer surface; a sealing surface radially inwardly of the radially outer surface of the main body portion for fluidly sealing the opening of the receptacle; wherein the stepped groove includes a first stepped surface having a detent which forms a stop that is configured to interact with a protrusion of the receptacle to prevent rotational movement of the main body portion relative to the receptacle, and wherein the stepped groove includes a second stepped surface at an elevation below the first stepped surface, the second stepped surface forming a catch that interacts with the protrusion to control removal of the cap from the receptacle.

According to another aspect of the present disclosure, a two-stage pressure relief and release cap for forming a closure of an opening in a receptacle of a container includes: a main body portion having a radially outer surface including a groove for receiving a corresponding protrusion of the receptacle, and a detent located in the groove for holding the protrusion and restricting rotation of the main body portion relative to the receptacle when the cap is in a locked state; a valve body portion within the main body portion, the valve body portion including a vent passage for relieving trapped gas in the receptacle; a valve member movable within the valve body between an open position in which the valve member opens the vent passage, and a closed position in which the valve member closes the vent passage; a valve actuator configured to operatively actuate the valve member between the open and closed position; and a grip at least partially supported by the valve actuator; wherein, in a first stage of removal of the cap from the receptacle, the grip is movable to a first position which causes activation of the valve actuator thereby causing actuation of the valve member to the open position, wherein in the first stage the detent maintains holding of the protrusion to maintain the locked state; and wherein, in a second stage of removal of the cap from the receptacle, the grip is movable to a second position which causes the main body portion to move relative to the receptacle thereby releasing the protrusion from the detent and enabling the cap to be removed from the receptacle.

Embodiments may include one or more features of the foregoing aspects, separately or in any combination, which may be combined with one or more of the following additional features, which may be included separately or in any combination.

In some embodiments, the cap further comprises a relief valve that is activatable to relieve pressure within the receptacle when actuated during removal of the cap.

In some embodiments, the cap further includes a valve actuator that is depressible to activate the relief valve.

In some embodiments, the cap further includes a grip overlying the main body portion and the valve actuator, the grip being supported by the valve actuator at least in a non-depressed state, and wherein depressing the grip with a force greater than a preset force causes the valve actuator to depress and activate the relief valve.

In some embodiments, the relief valve includes a valve body having a vent passage, and a valve member movable in the valve body to open and close the vent passage, wherein the valve body is radially inwardly spaced from an internal surface of the main body portion to form an annulus therebetween, and wherein the receptacle is fittable within the annulus such that the valve body is disposed within the opening of the receptacle when the cap is in the locked state on the receptacle.

In some embodiments, the valve body includes the sealing surface in the form of a seal disposed in a radial seal groove.

In some embodiments, the groove of the main body portion is a stepped groove.

In some embodiments, the stepped groove includes a first stepped surface having the detent which forms a stop that is configured to interact with the protrusion of the receptacle to restrict rotational movement of the main body portion relative to the receptacle, and wherein the groove includes a second stepped surface at an elevation below the first stepped surface, the second stepped surface forming a catch that is configured to interact with the protrusion to control removal of the cap from the receptacle.

In some embodiments, the detent is formed as a ridge at an edge of the first stepped surface.

In some embodiments, the second stepped surface is axially spaced from the first stepped surface by a first axial distance; wherein, when the cap is in the locked state on the receptacle, the sealing surface is axially spaced from a radial through passage of a receptacle by a second axial distance; and wherein the second axial distance is less than the first axial distance, such that when the cap is axially moved during removal and the protrusion moves from the first stepped surface to the second stepped surface, the sealing surface moves past the radial through passage enabling the receptacle to vent trapped gas.

In some embodiments, the cap further includes a grip that overlies the main body portion, the grip forming a clutch mechanism with the main body portion, such that grip is freely rotatable about the main body portion when the grip is in a non-depressed state, and engages and transfers torque to the main body portion when the grip is in a depressed state.

In some embodiments, the grip includes a plurality of grip lugs, the grip lugs being configured to interface with respective main body lugs on the main body portion when the grip is in the depressed state.

In some embodiments, the main body portion includes a plurality of grooves circumferentially spaced apart about the radially outer surface for receiving a respective plurality of protrusions of the receptacle, and a detent is located in each of the plurality of grooves for receiving a corresponding protrusion of the plurality of protrusions.

In some embodiments, the cap further comprises a plurality of magnets located at a bottom portion of the main body portion for a proximity sensor, the plurality of magnets being circumferentially spaced apart between the plurality of grooves, and wherein each groove of the plurality of grooves has associated therewith at least one corresponding magnet of the plurality of magnets.

In some embodiments, the cap further includes a lock/release actuator configured to effect holding of the protrusion by the detent in the groove in a locking state of the lock/release actuator, and configured to effect releasing of the protrusion from the detent in the groove in a releasing state of the lock/release actuator.

In some embodiments, in the first stage of removal, the lock/release actuator is in the locking state.

In some embodiments, in the second stage of removal, the lock/release actuator is in the releasing state.

In some embodiments, the valve actuator includes a first biasing member having a first biasing force that constitutes at least a portion of a first preset force for activating the valve actuator and thereby actuation of the valve member to the open position.

In some embodiments, the lock/release actuator includes a second biasing member having a second biasing force that constitutes at least a portion of a second preset force for releasing the protrusion from the detent.

In some embodiments, the second preset force is greater than the first preset force.

In some embodiments, the grip is axially depressible to the first position to axially move the actuator and thereby axially move the valve member to the open position.

In some embodiments, the grip is further axially depressible to the second position beyond the first position to axially move the main body portion relative to the receptacle such that the protrusion axially moves in the groove to release from the detent, thereby enabling the cap to be rotated whereby the protrusion can clear the detent during rotation and enable removal of the cap.

According to another aspect, the cap according to any of the foregoing is in combination with the receptacle, wherein the receptacle includes: a tube portion having the opening and a main valve member for containing internal pressure within the container, and a rim portion surrounding the tube portion to form an annular socket, wherein the protrusion protrudes from the rim portion into the annular socket, the protrusion including a roller that is guidably received by the groove of the cap.

According to another aspect, the cap according to any of the foregoing is in combination with the receptacle and the container, wherein the container is configured to contain a cryogenic fluid, such as liquified natural gas.

According to another aspect, a method of removing a cap from a receptacle of a container, includes: (i) activating a valve of the cap to permit trapped gas to vent from the receptacle while the cap remains secured to the receptacle via a lock; (ii) moving the cap to an intermediate removal position in which a catch intercepts part of the receptacle to hold the cap at the intermediate removal position; and (iii) moving the cap away from the catch at the intermediate removal position and removing the cap from the receptacle.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operative connection or coupling may include the entities being integral and unitary with each other.

It is to be understood that all ranges and ratio limits disclosed in the specification and claims may be combined in any manner. The term "about" as used herein refers to any value which lies within the range defined by a variation of up to ±10% of the stated value, for example, ±10%, ±9%, ±8%, ±7%, ±6%, ±5%, ±4%, ±3%, ±2%, ±1%, ±0.01%, or ±0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A cap for forming a closure in a receptacle of a container, the cap comprising:
   a valve configured to relieve trapped gas in the receptacle; and
   a catch configured to control movement of the cap during removal of the cap from the receptacle;
   the cap being configured such that:
   (i) in a first stage of removal of the cap from the receptacle, the valve is activatable to permit the trapped gas to vent from the receptacle while the cap remains secured to the receptacle; and (ii) in a second stage of removal of the cap from the receptacle, the cap is movable to an intermediate removal position in which the catch intercepts part of the receptacle to control movement of the cap before further removal of the cap from the receptacle; and further comprising a lock that is operative in at least (i) a locked state to secure the cap to the receptacle, and (ii) a release state to enable the cap to be removed from the receptacle;

wherein the cap is configured such that in the locked state: (i) the valve is activatable to vent trapped gas, and (ii) the lock prevents transition to the second stage of removal without first achieving the release state of the lock;

wherein the cap is configured such that axial movement of the cap by a predetermined axial amount and rotational movement by a predetermined rotational amount permits transition of the lock from the lock state to the release state at a release position;

wherein the lock interacts with part of the receptacle via a stop at a lock position to provide the lock state, and the part of the receptacle releases from the stop at a release position to provide the release state; and wherein the catch is at the intermediate removal position which is circumferentially and axially offset from the lock position and axially offset from the release position, the cap being configured to freely move axially from the release position to the catch at the intermediate removal position without rotation of the cap, and wherein the catch is configured to hold the cap at the intermediate removal position; and wherein the cap is configured such that at least rotational movement of the cap from the intermediate removal position by a predetermined amount enables removal of the cap from the receptacle.

2. The cap according to claim 1, wherein the lock and catch are formed in a groove of the cap or by respective parts of a groove of the cap.

3. The cap according to claim 1, wherein the valve includes a valve body having a vent passage, and a valve member movable in the valve body to open and close the vent passage, wherein the valve body is radially inwardly spaced from an internal surface of a main body portion of the cap to form an annulus therebetween, and wherein the receptacle is fittable within the annulus such that the valve body is disposed within an opening of the receptacle when the cap is in the locked state on the receptacle.

4. The cap according to claim 1, wherein the cap further includes:
a valve actuator that is depressible to activate the valve; and
a grip overlying a main body portion and the valve actuator, the grip being supported by the valve actuator at least in a non-depressed state, and wherein depressing the grip with a force greater than a preset force causes the valve actuator to depress and activate the valve.

5. The cap according to claim 4, wherein:
the part of the receptacle is a protrusion;
the grip is axially depressible to a first position to axially move the valve actuator and thereby axially move the valve to its open position; and
the grip is further axially depressible to a second position beyond the first position to axially move the main body portion relative to the receptacle such that the protrusion of the receptacle axially moves in a groove of the cap to release from a stop, thereby enabling the cap to be rotated whereby the protrusion can clear the stop during rotation and enable removal of the cap.

6. The cap according to claim 4, wherein the grip forms a clutch mechanism with the main body portion, such that grip is freely rotatable about the main body portion when the grip is in a non-depressed state, and engages and transfers torque to the main body portion when the grip is in a depressed state.

7. The cap according to claim 6, wherein the grip includes a plurality of grip lugs, the grip lugs being configured to interface with respective main body lugs on the main body portion when the grip is in the depressed state.

8. The cap according to claim 1, wherein the cap further comprises a lock/release actuator configured to effect holding of the part of the receptacle by the lock in a locking state of the lock/release actuator, and configured to effect releasing of the part of the receptacle from the lock in a releasing state of the lock/release actuator;

wherein, in the first stage of removal, the lock/release actuator is in the locking state; and wherein, in the second stage of removal, the lock/release actuator is in the releasing state.

9. The cap according to claim 8,
wherein the cap further includes a valve actuator that is depressible to activate the valve;

wherein the valve actuator includes a first biasing member having a first biasing force that constitutes at least a portion of a first preset force for activating the valve actuator and thereby actuation of the valve to the open position;

the lock/release actuator includes a second biasing member having a second biasing force that constitutes at least a portion of a second preset force for releasing the cap from the receptacle; and the second preset force is greater than the first preset force.

10. The cap according to claim 1,
wherein a main body portion of the cap includes a plurality of grooves circumferentially spaced apart about the radially outer surface for receiving a respective plurality of protrusions of the receptacle, and a detent is located in each of the plurality of grooves for receiving and holding a corresponding protrusion of the plurality of protrusions;

wherein the cap further comprises a plurality of magnets located at a bottom portion of the main body portion for a proximity sensor, the plurality of magnets being circumferentially spaced apart between the plurality of grooves, and wherein each groove of the plurality of grooves has associated therewith at least one corresponding magnet of the plurality of magnets.

11. A container comprising:
the cap according to claim 1;
a receptacle including:
a tube portion having an opening and a main valve member for containing internal pressure within the container, and
a rim portion surrounding the tube portion to form an annular socket,
wherein the part of the receptacle is a protrusion that protrudes from the rim portion into the annular socket, the protrusion including a roller that is guidably received by a groove of the cap;

wherein the container is configured to contain a cryogenic fluid and the cap is configured to contain gas or liquid of the cryogenic fluid.

12. The cap according to claim 1, the cap further comprising:
a main body portion having a radially outer surface including a groove for receiving a corresponding protrusion of the receptacle, and a detent located in the groove for holding the protrusion and restricting rotation of the main body portion relative to the receptacle when the cap is in a locked state;
a valve body portion within the main body portion, the valve body portion including a vent passage for relieving trapped gas in the receptacle;
a valve member movable within the valve body between an open position in which the valve member opens the vent passage, and a closed position in which the valve member closes the vent passage;
a valve actuator configured to operatively actuate the valve member between the open and closed position;
a grip at least partially supported by the valve actuator;
wherein, in the first stage of removal of the cap from the receptacle, the grip is movable to a first position which causes activation of the valve actuator thereby causing actuation of the valve member to the open position, wherein in the first stage the detent maintains holding of the protrusion to maintain the locked state; and
wherein, in the second stage of removal of the cap from the receptacle, the grip is movable to a second position which causes the main body portion to move relative to the receptacle thereby releasing the protrusion from the detent and enabling the cap to be removed from the receptacle;
the cap further comprising a lock/release actuator configured to effect holding of the protrusion by the detent in the groove in a locking state of the lock/release actuator, and configured to effect releasing of the protrusion from the detent in the groove in a releasing state of the lock/release actuator; wherein, in the first stage of removal, the lock/release actuator is in the locking state; and wherein, in the second stage of removal, the lock/release actuator is in the releasing state;
wherein the valve actuator includes a first biasing member having a first biasing force that constitutes at least a portion of a first preset force for activating the valve actuator and thereby actuation of the valve member to the open position;
wherein the lock/release actuator includes a second biasing member having a second biasing force that constitutes at least a portion of a second preset force for releasing the protrusion from the detent; and
wherein the second preset force is greater than the first preset force.

13. A cap for forming a closure in a receptacle of a container, the comprising:
a valve configured to relieve trapped gas in the receptacle; and
a catch configured to control movement of the cap during removal of the cap from the receptacle;
the cap being configured such that:
(i) in a first stage of removal of the cap from the receptacle, the valve is activatable to permit the trapped gas to vent from the receptacle while the cap remains secured to the receptacle;
(ii) in a second stage of removal of the cap from the receptacle, the cap is movable to an intermediate removal position in which the catch intercepts part of the receptacle to control movement of the cap before further removal of the cap from the receptacle; and
a lock that is operative in at least (i) a locked state to secure the cap to the receptacle, and (ii) a release state to enable the cap to be removed from the receptacle;
wherein the cap is configured such that in the locked state:
(i) the valve is activatable to vent trapped gas, and (ii) the lock prevents transition to the second stage of removal without first achieving the release state of the lock;
wherein the cap includes a stepped groove in a body of the cap, the stepped groove including a first stepped surface having a stop that forms at least a part of the lock, the stop being configured to interact with a part of the receptacle to restrict rotational movement of the body of the cap relative to the receptacle, and
wherein the stepped groove includes a second stepped surface at an elevation below the first stepped surface, the second stepped surface forming the catch which is configured to interact with the part of the receptacle to intercept and control removal of the cap from the receptacle.

14. The cap according to claim 13, wherein the stop is formed as a detent in the form of a ridge at an edge of the first stepped surface.

15. The cap according to claim 13,
wherein the part of the receptacle is a protrusion;
wherein the cap further comprises a sealing surface configured to fluidly seal an opening of the receptacle;
wherein the second stepped surface is axially spaced from the first stepped surface by a first axial distance;
wherein, when the cap is in the locked state on the receptacle, the sealing surface is axially spaced from a radial through passage of a receptacle by a second axial distance; and
wherein the second axial distance is less than the first axial distance, such that when the cap is axially moved during removal and the protrusion moves from the first stepped surface to the second stepped surface, the sealing surface moves past the radial through passage enabling the receptacle to vent trapped gas.

16. A pressure relief and release cap for forming a closure of an opening in a receptacle of a container, the cap comprising:
a main body portion having a radially outer surface including a groove for receiving a corresponding protrusion of the receptacle, and a detent located in the groove for holding the protrusion and restricting rotation of the main body portion relative to the receptacle when the cap is in a locked state;
a valve body portion within the main body portion, the valve body portion including a vent passage for relieving trapped gas in the receptacle;
a valve member movable within the valve body between an open position in which the valve member opens the vent passage, and a closed position in which the valve member closes the vent passage;
a valve actuator configured to operatively actuate the valve member between the open and closed position; and
a grip at least partially supported by the valve actuator;
wherein, in a first stage of removal of the cap from the receptacle, the grip is movable to a first position which causes activation of the valve actuator thereby causing actuation of the valve member to the open position, wherein in the first stage the detent maintains holding of the protrusion to maintain the locked state; and wherein, in a second stage of removal of the cap from the receptacle, the grip is movable to a second position which causes the main body portion to move relative to the receptacle thereby releasing the protrusion from the detent and enabling the cap to be removed from the receptacle.

17. The cap according to claim 16, further comprising a lock/release actuator configured to effect holding of the protrusion by the detent in the groove in a locking state of the lock/release actuator, and configured to effect releasing of the protrusion from the detent in the groove in a releasing state of the lock/release actuator;

wherein, in the first stage of removal, the lock/release actuator is in the locking state; and wherein, in the second stage of removal, the lock/release actuator is in the releasing state;

wherein the valve actuator includes a first biasing member having a first biasing force that constitutes at least a portion of a first preset force for activating the valve actuator and thereby actuation of the valve member to the open position;

wherein the lock/release actuator includes a second biasing member having a second biasing force that constitutes at least a portion of a second preset force for releasing the protrusion from the detent; and wherein the second preset force is greater than the first preset force.

18. A cap for forming a closure in a receptacle of a container, the comprising:

a valve configured to relieve trapped gas in the receptacle; and a catch configured to control movement of the cap during removal of the cap from the receptacle;

the cap being configured such that:

(i) in a first stage of removal of the cap from the receptacle, the valve is activatable to permit the trapped gas to vent from the receptacle while the cap remains secured to the receptacle; and (ii) in a second stage of removal of the cap from the receptacle, the cap is movable to an intermediate removal position in which the catch intercepts part of the receptacle to control movement of the cap before further removal of the cap from the receptacle; and a lock that is operative in at least (i) a locked state to secure the cap to the receptacle, and (ii) a release state to enable the cap to be removed from the receptacle; wherein the lock interacts with part of the receptacle via a stop at a lock position to provide the lock state, and the part of the receptacle releases from the stop at a release position to provide the release state.

* * * * *